(12) United States Patent
Aydin et al.

(10) Patent No.: US 11,803,946 B2
(45) Date of Patent: Oct. 31, 2023

(54) DEEP SDR-HDR CONVERSION

(71) Applicant: Disney Enterprises, Inc., Burbank, CA (US)

(72) Inventors: Tunc Ozan Aydin, Zurich (CH); Yang Zhang, Zurich (CH); Blake Sloan, New York, NY (US); Jeroen Schulte, San Francisco, CA (US); Michael Maloney, New York, NY (US)

(73) Assignee: Disney Enterprises, Inc., Burbank, CA (US)

( * ) Notice: Subject to any disclaimer, the term of this patent is extended or adjusted under 35 U.S.C. 154(b) by 59 days.

(21) Appl. No.: 16/948,336

(22) Filed: Sep. 14, 2020

(65) Prior Publication Data

US 2022/0084170 A1   Mar. 17, 2022

(51) Int. Cl.
*G06T 5/00* (2006.01)
*G06T 5/50* (2006.01)
*G06N 3/08* (2023.01)

(52) U.S. Cl.
CPC ............ *G06T 5/007* (2013.01); *G06N 3/08* (2013.01); *G06T 5/50* (2013.01); *G06T 2207/10024* (2013.01); *G06T 2207/20081* (2013.01); *G06T 2207/20084* (2013.01); *G06T 2207/20208* (2013.01)

(58) Field of Classification Search
CPC .......... G06T 5/00; G06T 5/007; G06T 5/008; G06T 5/50; G06T 2207/10024; G06T 2207/10036; G06T 2207/20081; G06T 2207/20084; G06T 2207/20208; G06T 2207/20172; G06T 2207/20212; G06T 2207/202212; G06N 3/08; G06N 3/02
USPC ................. 382/100, 254, 274, 276, 284
See application file for complete search history.

(56) References Cited

U.S. PATENT DOCUMENTS

| 7,009,733 | B2 * | 3/2006 | Gruzdev ............ H04N 1/62 358/1.9 |
| 2013/0070965 | A1 | 3/2013 | Jang et al. |
| 2014/0050417 | A1 | 2/2014 | Jiang et al. |
| 2015/0302562 | A1 | 10/2015 | Zhai et al. |
| 2016/0292824 | A1 | 10/2016 | Li et al. |

(Continued)

FOREIGN PATENT DOCUMENTS

CN    111754412 A  * 10/2020

OTHER PUBLICATIONS

Gabriel Eilertsen, Joel Kronander, Gyorgy Denes, Ratal K. Mantiuk, and Jonas Unger. 2017. HDR image reconstruction from a single exposure using deep CNNs. ACM Trans. Graph. 36, 6, Article 178 (Dec. 2017), 15 pages, https://doi.org/10.1145/3130800.3130816 (Year: 2017).*

(Continued)

*Primary Examiner* — Vikkram Bali
(74) *Attorney, Agent, or Firm* — Farjami & Farjami LLP

(57) ABSTRACT

The exemplary embodiments relate to converting Standard Dynamic Range (SDR) content to High Dynamic Range (HDR) content using a machine learning system. In some embodiments, the neural network is trained to convert an input SDR image into an HDR image using the encoded representation of a training SDR image and a training HDR image. In other embodiments, the neural network is trained (Continued)

to convert an input SDR image into an HDR image using a predefined set of color grading actions and the training images.

23 Claims, 7 Drawing Sheets

(56) References Cited

U.S. PATENT DOCUMENTS

| | | | |
|---|---|---|---|
| 2019/0080440 A1 | 3/2019 | Eriksson et al. | |
| 2019/0096046 A1* | 3/2019 | Kalantari | G06T 5/008 |
| 2021/0166360 A1 | 6/2021 | Kim et al. | |
| 2021/0382549 A1* | 12/2021 | Zheng | H04N 5/2355 |
| 2022/0076370 A1* | 3/2022 | Kawai | H04N 5/66 |
| 2022/0078386 A1* | 3/2022 | Zink | H04N 9/67 |

OTHER PUBLICATIONS

Zhang, Y. and Aydin, T.O. (2021), Deep HDR estimation with generative detail reconstruction. Computer Graphics Forum, 40: 179-190. https://doi.org/10.1111/cgf.142624 (Year: 2021).*

Guilin Liu, Fitsum A. Reda, Kevin J. Shih, Ting-Chun Wang, Andrew Tao, Bryan Catanzaro "Image Inpainting for Regular Holes Using Partial Convolutions" Proceedings on the European Conference on Computer Vision, 2018 pp. 1-23.

Pan Shao, Shouhong Ding, Lizhuang Ma, Yunsheng Wu, Yongjian Wu "Edge-preserving image decomposition via joint weighted least squares" Computational Visual Media, vol. 1, No. 1, Mar. 2015 pp. 37-47.

Yuki Endo, Yoshihiro Kanamori, Jun Mitani "Deep Reverse Tone Mapping" ACM Transactions on Graphics vol. 36, No. 6, Article 177, Nov. 2017 pp. 1-10.

Gabriel Eilertsen, Joel Kronander, Gyorgy Denes, Rafal K. Mantiuk, Jonas Unger "HDR image reconstruction from a single exposure using deep CNNs" ACM Transactions on Graphics vol. 36, No. 6, Article 178, Nov. 2017 pp. 1-15.

Yannick Hold-Geoffroy, Kalyan Sunkavalli, Sunil Hadap, Emiliano Gambaretto, Jean-François Lalonde "Deep Outdoor Illumination Estimation" ResearchGate, Jul. 2017. pp. 1-11.

Gabriel Eilertsen, Joel Kronander, Gyorgy Denes, Rafal K. Mantiuk, Jonas Unger "HDR image reconstruction from a single exposure using deep CNNs" ACM Transactions on Graphics, vol. 36, No. 6, Article 178. Publication date: Nov. 2017. pp. 1-15.

Jiahui Yu, Zhe Lin, Jimei Yang, Xiaohui Shen, Xin Lu, Thomas S. Huang "Generative Image Inpainting with Contextual Attention" Computer Vision Foundation (CVF) pp. 5505-5514.

* cited by examiner

DEEP SDR-HDR CONVERSION

BACKGROUND INFORMATION

A display device may support Standard Dynamic Range (SDR) content and High Dynamic Range (HDR) content. Compared to SDR content, HDR content may support a greater dynamic range of luminosity, more contrast and a wider range of colors. Therefore, HDR content may provide a better viewing experience.

Workflows for HDR color grading and HDR remastering require a significant amount of manual input. These processes may include multiple iterations and quality control checks that may take highly experienced technicians anywhere from a few days to a few weeks to finish. As a result, HDR color grading and HDR remastering may require a significant amount of resources. Due to this cost, a large amount of available content is not configured in HDR format. Accordingly, there is a need to reduce the complexity, time, money and other resources involved in HDR color grading and HDR remastering.

Techniques for converting SDR content to HDR content (e.g., HDR color grading, HDR remastering, etc.) often encounter two fundamental issues. One issue is that quantization effects and banding artifacts may become visible due to the dynamic range extension from SDR format to HDR format. Under most circumstances, it may take an experienced technician several iterations to adequately blend the different shades of similar colors. Another issue is the hallucination of clipped details that may appear in the under-exposed or over-exposed regions in the SDR image. For example, due to its limited range, a pixel value may be clipped at a maximal or minimal value and the variation in bright or dark regions may be lost in the SDR image. Under most circumstances, it may take an experienced technician several iterations to render an HDR image that adequately portrays the details of the under-exposed or over-exposed regions of the SDR image.

Accordingly, there is a need for a system that may be used for converting SDR content to HDR content that adequately addresses the fundamental issues mentioned above without being restricted to a particular problem domain or resolution and without producing excessive blur.

DETAILED DESCRIPTION

Figure 1:
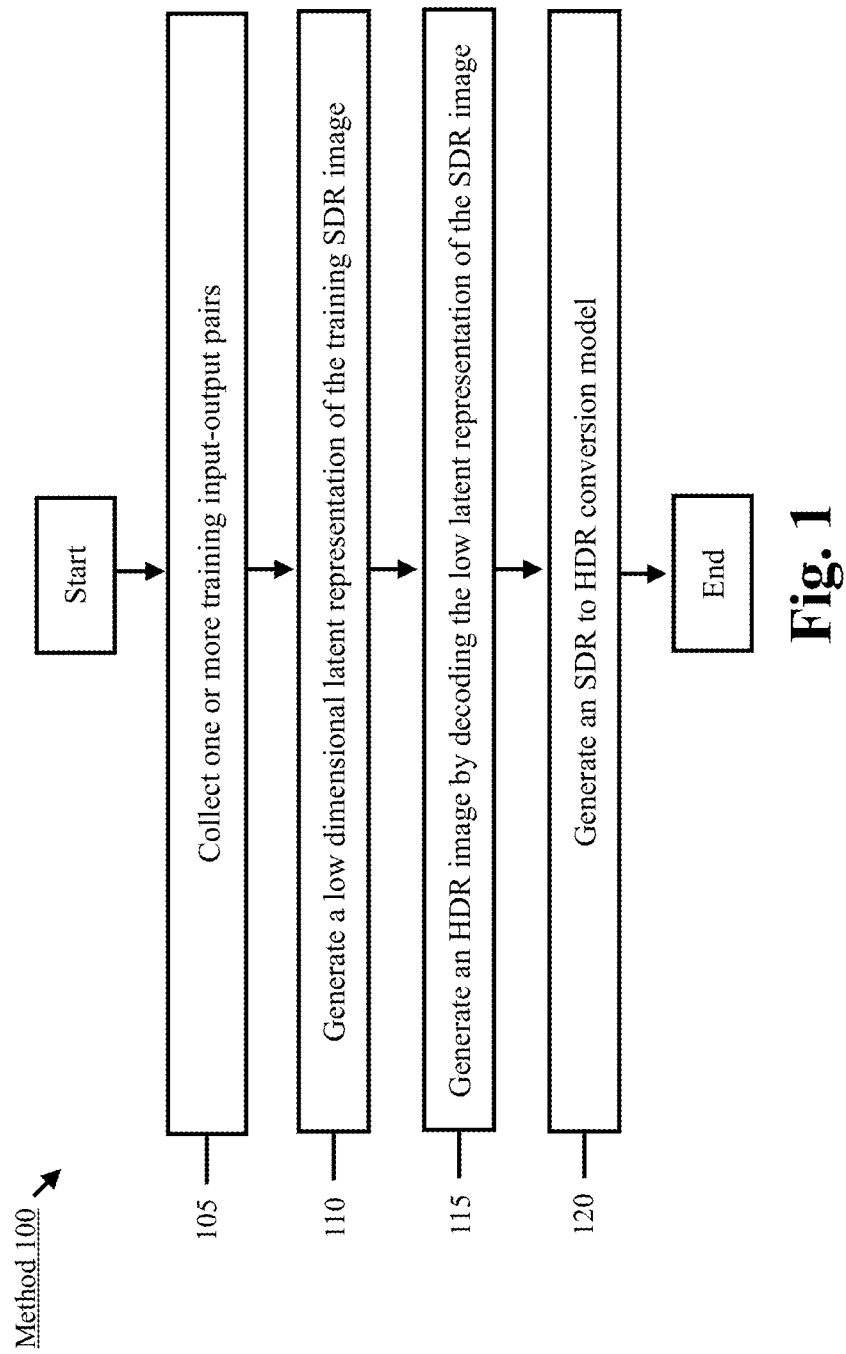
FIG. 1 shows a method for training a neural network to convert standard dynamic range (SDR) content to high dynamic range (HDR) content according to various exemplary embodiments.

The exemplary embodiments may be further understood with reference to the following description and the related appended drawings, wherein like elements are provided with the same reference numerals. The exemplary embodiments relate to converting Standard Dynamic Range (SDR) content to High Dynamic Range (HDR) content using a novel machine learning system. The quality of results produced by prior machine learning systems proved inconsistent and tended to be too blurry to be used in practice. Furthermore, previous machine learning systems restricted problem domains (e.g. focusing solely on reconstructing details of over-exposed sky images), thus being restricted to specific and simple problem domains and only capable of handling very low resolution images. Accordingly, there is a need for a machine learning system that may be used for converting SDR content to HDR content that adequately addresses the fundamental issues mentioned above without being restricted to a particular problem domain or resolution and without producing excessive blur.

The exemplary embodiments are described with regard to SDR and HDR. Generally, these terms refer to an image/video format that is capable of a particular dynamic range of luminosity. For example, SDR content may be configured with a dynamic range of luminosity that is based on a gamma curve or any other standard range. In contrast, HDR content may be configured with a dynamic range of luminosity that exceeds a standard dynamic range of luminosity. Further, HDR content may also support a wider color gamut compared to SDR content.

There are multiple variations of SDR and HDR respectively. The exemplary embodiments are not limited to any particular type of SDR or HDR. Those skilled in the art will understand the scope of the terms SDR and HDR and how they are distinct from one another. Accordingly, throughout this description, SDR content may refer to image or video data configured with certain display related parameters that are restricted to a standard range and HDR content may refer to image or video data configured with one or more display parameters that have a range that exceeds what is considered standard.

The exemplary embodiments are also described with regard to a machine learning system configured to perform SDR to HDR conversation. In one approach, the exemplary embodiments relate to a neural network configured to automatically infer HDR content from input SDR content using a high dimensional mapping. For example, a supervised learning neural network may be trained to generate a model for mapping an input SDR image to an HDR image. Throughout this description, this approach may be described with regard to an autoencoder architecture with fully convolutional layers and skip-links between the encoder and decoder. Specific examples of training this type of neural network and how it may be used for SDR to HDR conversion will be explained in more detail below. However, any reference to a supervised learning neural network or an autoencoder architecture is merely provided for illustrative purposes. The exemplary embodiments may apply to any appropriate machine learning approach that may be trained to learn an implicit mapping from SDR to HDR.

In another approach, the exemplary embodiments relate to a neural network configured to generate an HDR image by applying one or more user defined actions to an input SDR image. For example, deep reinforced learning (DRL) may be used to generate a model for applying user defined actions to an input SDR image to generate an HDR image. Throughout this description, this approach may be described with regard to an asynchronous advantage actor-critic (A3C) network architecture that includes a policy network and a value network. Specific examples of training this type of neural network and how it may be used for SDR to HDR conversion will be explained in more detail below. However, any reference to DRL or a A3C network is merely provided for illustrative purposes. The exemplary embodiments may apply to any appropriate machine learning approach that may be trained to perform SDR to HDR conversion using explicit user defined actions. Further, the exemplary embodiments described herein may be used in conjunction with other currently implemented SDR to HDR conversion techniques, future implementations of SDR to HDR conversion techniques or independently from other SDR to HDR conversion techniques.

As mentioned above, one of the exemplary approaches relates to utilizing a supervised learning neural network. Those skilled in the art will understand that a supervised learning neural network performs the task of learning a function that maps an input to an output using training input-output pairs. As will be described in more detail below, in this context, the input-output pairs may be an SDR image and a corresponding HDR image. Once trained, the neural network may then be used to infer HDR content from SDR input.

FIG. 1 shows a method 100 for training a neural network to convert SDR content to HDR content according to various exemplary embodiments. Those skilled in the art will understand that the operations described below may be performed by any appropriate combination of hardware, software or firmware configured to implement the exemplary concepts described herein. Specific examples of the type of hardware, software or firmware that may be utilized will be described below with regard to FIG. 7.

In 105, one or more training input-output pairs are collected. In this example, each input-output pair may include an SDR image and a corresponding HDR image. However, reference to an image is merely provided for illustrative purposes. Those skilled in the art will understand that the exemplary concepts described herein may be applicable to any appropriate type of image or video data. For example, video data including multiple frames may be used for training.

Throughout this description, an image may be characterized as a "training image" when the image is to be used to train a neural network. For example, a training SDR image and a training HDR image may form a pair of training images. The method 100 will be described with regard to a single pair of training images. However, in an actual training process, a training dataset of multiple pairs of training images may be utilized to train the neural network.

The neural network is configured to generate an HDR image from SDR input. This may include estimating portions of the SDR input image that may be lost due to its dynamic range of luminosity. For example, certain features of the SDR image may be lost in areas of pure white (over-exposed) or pure black (under-exposed) because the dynamic range of luminosity may not be capable of showing variations between shades that exceed a maximal or minimal value of the dynamic luminosity range. The dynamic range of luminosity for HDR exceeds the dynamic range of luminosity for SDR. Thus, when generating the HDR image from SDR input, the portions of the SDR image that were lost due to its limited dynamic range of luminosity may be reconstructed in the HDR image.

"Highlight roll off" may refer to the transition between a clipped light level (e.g., a maximum threshold of the dynamic range of luminosity) and the surrounding highlights. The neural network may reconstruct rolled off highlights when generating the HDR image from SDR input. Similarly, the neural network may reconstruct transitions between shadows and a clipped light level (e.g., a minimum threshold of the dynamic range of luminosity). Generally, the goal is to provide a smooth transition or roll off. However, there is an artistic aspect to color grading and thus, the neural network may be configured to provide a smooth transition, an abrupt transition, or any other appropriate type of transition.

Figure 2:
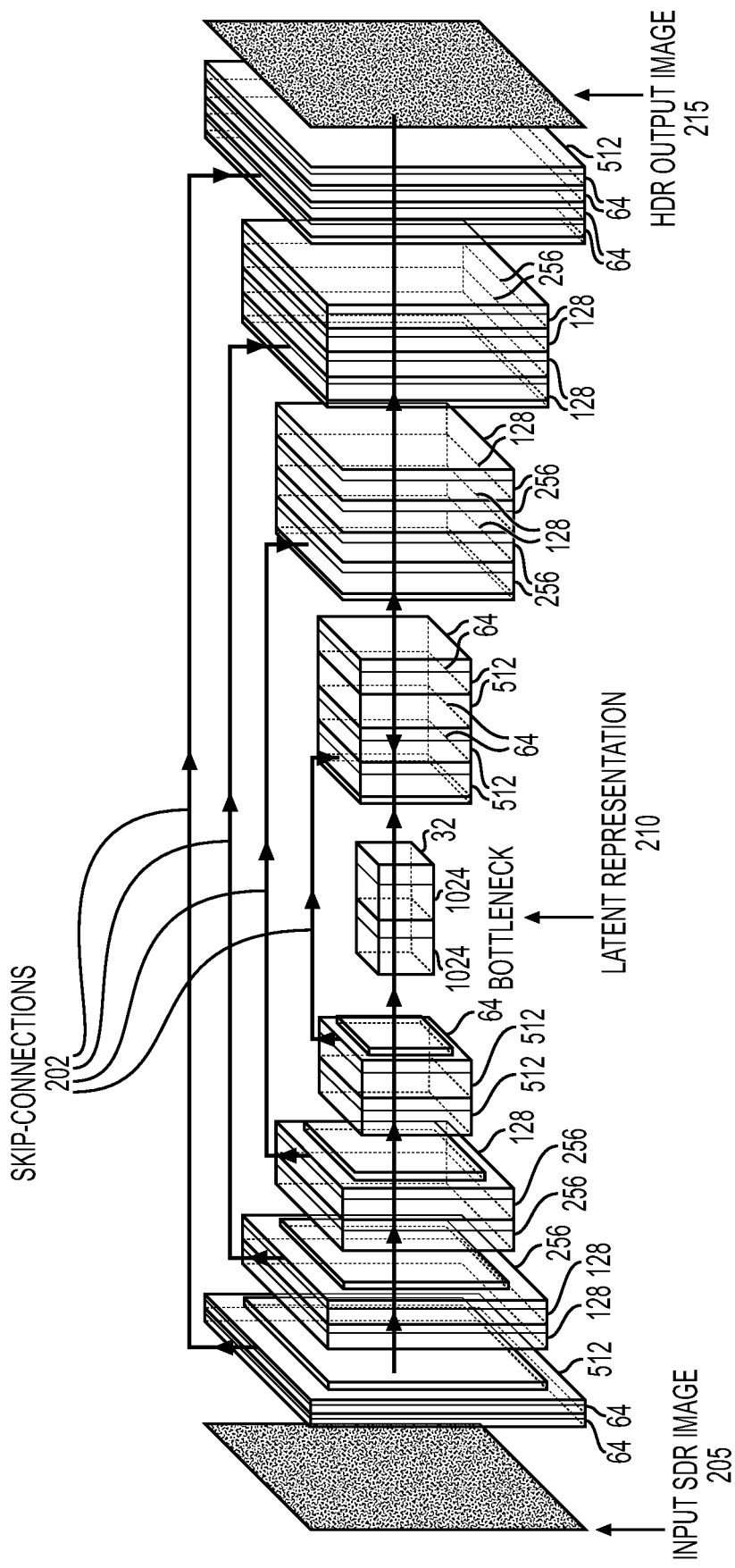
FIG. 2 illustrates an autoencoder network architecture with fully convolutional layers and skip-links between encoder and decoder.

Prior to discussing how to train the neural network, a description of the neural network architecture is provided. FIG. 2 illustrates an autoencoder network architecture with fully convolutional layers and skip-links between encoder and decoder. In addition to reconstructing rolled off highlights, this neural network architecture may be used for mapping the dynamic range of luminosity and color gamut from SDR images to HDR images.

Those skilled in the art will understand that an autoencoder is a type of neural network that includes an encoder that is configured to transform data into a latent representation and a decoder that is configured to transform the latent representation into another type of data. For example, given an input SDR image, the neural network may encode it into a low dimensional latent representation. With regard to FIG. 2, the input SDR image 205 is encoded to the latent representation 210. The latent representation may then be decoded to generate an HDR output image 215.

The skip-connections 202 from each encoder layer to its corresponding decoder layer enables local detail information reconstruction during decoding. In the decoder, concatenation of the convolutional layers in the encoder and corresponding decoder layers may be applied. In some embodiments, 3×3 kernel sizes may be used to generate feature maps for all of the convolutional layers. Further, max-pooling may be employed in the encoder and up-sampling may be employed in the decoder. In some embodiments, this neural network may be trained using exponential linear unit (ELU) activation for all the convolutional layers. Those skilled in the art will understand the ELUs code the degree of presence of a particular phenomena in the input without quantitatively modeling the degree of their absence. In addition, ELUs saturate a negative value when the argument gets smaller. Therefore, the representation is both noise-robust and low-complex. These features speed up learning in deep neural networks and provide higher classification accuracies compared to the units of other activation functions. (See, e.g., D.-A. Clevert, T. Unterthiner, S. Hochreiter, Fast and accurate deep network learning by exponential linear units (elus), arXiv preprint arXiv:1511.07289 (2015).)

Returning to the method 100, in 110, a low dimensional latent representation of the training SDR image is generated. For example, as discussed above with regard to FIG. 2, the SDR image may be encoded by the autoencoder architecture. In 115, an HDR image is generated by decoding the low latent representation of the SDR image. During training, the neural network attempts to generate an HDR image that is at least similar to the training HDR image corresponding to the training SDR image.

In 120, an SDR to HDR conversion model is generated based on processing the training dataset. As mentioned above, the SDR to HDR model is configured to reconstruct rolled off highlights and map the dynamic range of luminosity and color gamut from SDR to HDR. For example, the neural network may learn an SDR to HDR conversion model, $\mathcal{F}$, using the following formula:

$$\mathcal{H} = \mathcal{F}(S_{SDR}; \theta)$$

Here, $S_{SDR}$ represents the input SDR image, $\mathcal{H}$ represents the output HDR image and $\theta$ represents model parameters. For training, the above formula may be configured as an optimization task where the neural network attempts to predict $\mathcal{H}$ as accurate as possible to the training HDR image, $\mathcal{H}_{HDR}$, by minimizing a loss function, $\mathcal{L}$ using the following formula:

$$\mathcal{L} = \frac{1}{n}\sum_{i=1}^{n}|\mathcal{H}_{HDR} - \mathcal{H}|$$

Here, n represents the total number of pixels and i represents the pixel index. Once learned, the SDR to HDR conversion model $\mathcal{F}$ may be used to generate an HDR image from SDR input.

Figure 3:
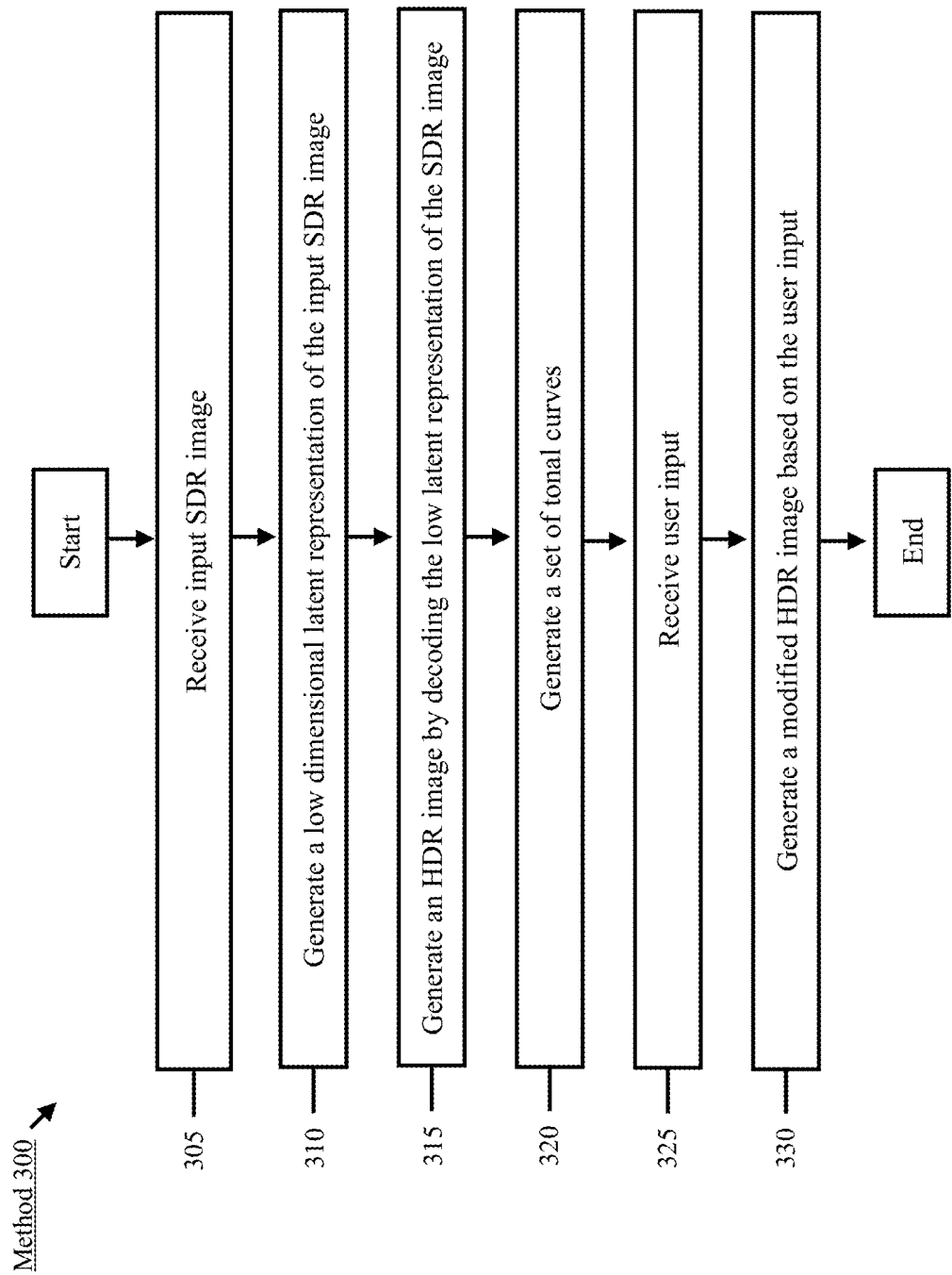
FIG. 3 shows a method for using the neural network to convert SDR content to HDR content according to various exemplary embodiments.

FIG. 3 shows a method 300 for using the neural network to convert SDR content to HDR content according to various exemplary embodiments. The method 300 provides an example of how a user may perform SDR to HDR conversion using the model learned by the neural network in accordance with the method 100. Those skilled in the art will understand that the operations described below may be performed by any appropriate combination of hardware, software or firmware configured to implement the exemplary concepts described herein. Specific examples of the type of hardware, software or firmware that may be utilized will be described below with regard to FIG. 7.

In 305, an input SDR image is received. As mentioned above, reference to an image is merely provided for illustrative purposes. Those skilled in the art will understand that the exemplary concepts described herein may be applicable to any appropriate type of image or video data.

In 310, a low dimensional latent representation of the SDR image is generated. For example, as discussed above with regard to FIG. 2, the SDR image may be encoded by the autoencoder architecture. In 315, an HDR image is generated by decoding the low latent representation of the SDR image. For example, using the learned SDR to HDR conversion model, $\mathcal{F}$, an HDR image may be predicted in the decoder from the encoded SDR image.

As mentioned above, there is an artistic aspect to HDR color grading. Thus, it may be beneficial to provide the user with the option to edit the HDR image.

In 320, a set of tonal curves is generated based on the HDR image. For example, a regression may be performed on the HDR image to generate a set of tonal curves that approximate the HDR image inferred by the neural network. The tonal curves may be displayed on a graphical user interface (GUI).

In 325, user input is received. For example, a colorist may edit the tonal curves displayed on the GUI to tune the HDR image in accordance with their artistic vision. For example, a spline based regression may be used to generate the tonal curve. The GUI may display a tonal curve configured with multiple control points. The user input may manipulate the control points to alter the HDR image. There may be multiple tone curves for different color channels.

In 330, a modified HDR image is generated based on the user input. Thus, the user may retain artistic control over the conversion process by manually editing the tonal curves.

As mentioned above, one exemplary approach relates to DRL. Those skilled in the art will understand that DRL is a machine learning technique where a neural network learns from its actions using a reward system. As will be described below, this neural network may perform dynamic range and color gamut adjustments on an input SDR image to generate an HDR image. These adjustments may be modeled after the actions a colorist may perform during the color grading process. A method for training a neural network using the DRL approach will be described below with regard to FIGS. 4-5. A method for using the neural network for SDR to HDR conversion will be described below with regard to the method 600.

Figure 4:
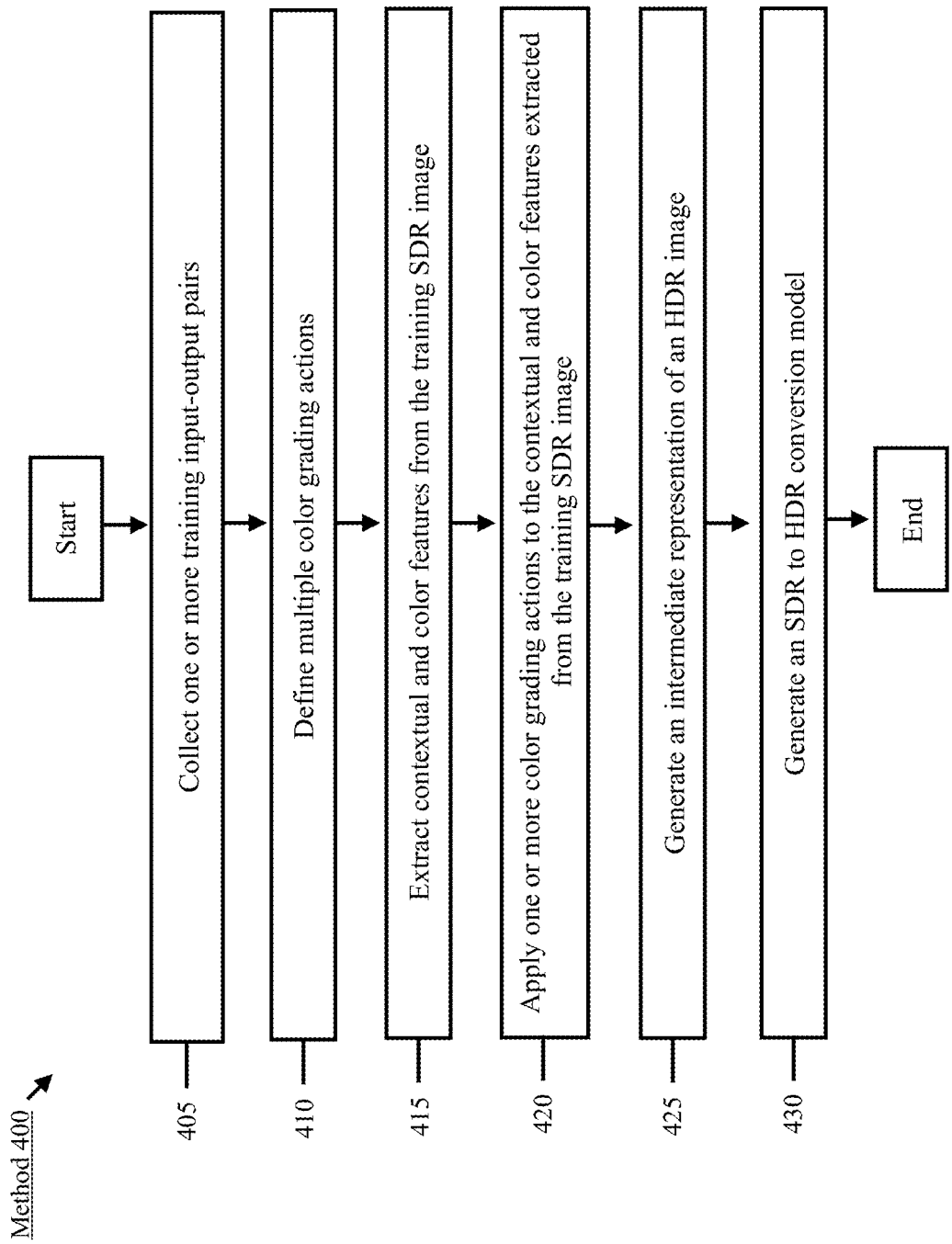
FIG. 4 shows a method for training a neural network to convert SDR content to HDR content according to various exemplary embodiments.

FIG. 4 shows a method 400 for training a neural network to convert SDR content to HDR content according to various exemplary embodiments. Those skilled in the art will understand that the operations described below may be performed by any appropriate combination of hardware, software or firmware configured to implement the exemplary concepts described herein. Specific examples of the type of hardware, software or firmware that may be utilized will be described below with regard to FIG. 7.

In 405, one or more training input-output pairs are collected. In this example, each input-output pair may include an SDR image and a corresponding HDR image. However, reference to an image is merely provided for illustrative purposes. Those skilled in the art will understand that the exemplary concepts described herein may be applicable to any appropriate type of image or video data.

In 410, multiple color grading actions are defined. A set of possible actions that may be applied to an SDR image to generate an HDR image may be generated based on an explicit action-wise modeling of the color grading process. For example, the color grading actions may include, but are not limited to, adjusting the brightness, adjusting the contrast, adjusting the color saturation, adjusting the exposure, etc. The adjustments may be applied to bright regions or shadows and on different color channels.

In 415, contextual and color features are extracted from the training SDR image. For example, a convolution neural network may be employed to perform the contextual and color feature extraction.

In 420, one or more color grading actions are applied to the contextual and color features extracted from the training SDR image. In 425, an intermediate representation of the HDR image is generated. If the intermediate representation satisfies a threshold value, this may indicate that the action applied to the training SDR image has generated an HDR image that is at least substantially similar to the training HDR image. If the grade does not satisfy the threshold value, this may indicate that additional actions may need to be applied to the intermediate representation for a satisfactory result. This process is repeated until a convergence result between the training SDR image and the training HDR image is achieved.

In 430, an SDR to HDR conversion model is generated based on processing the training dataset. A more detailed description of the actions performed at the neural network level is described in more detail below with regard to FIG. 5.

Figure 5:
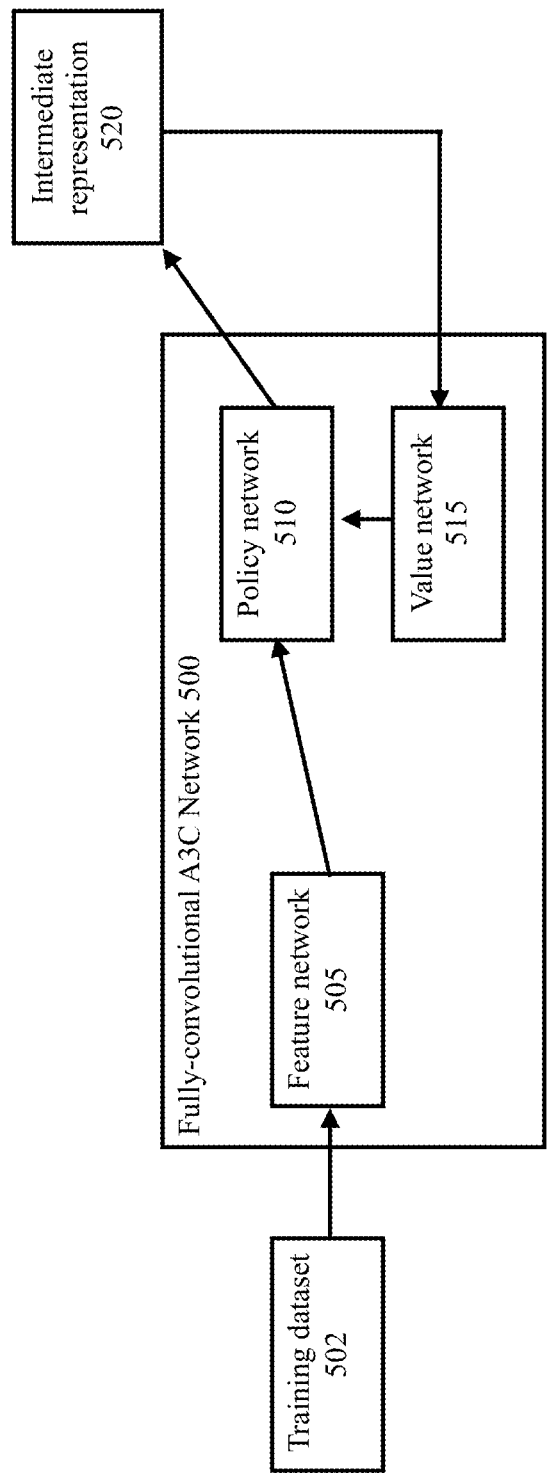
FIG. 5 illustrates an exemplary fully-convolutional asynchronous advantage actor-critic (A3C) network architecture.

FIG. 5 illustrates an exemplary fully-convolutional asynchronous advantage actor-critic (A3C) network architecture 500. Those skilled in the art will understand that an A3C network includes one or more agents (not pictured), a feature network 505, a policy network 510 and a value network 515.

As indicated above, initially, a training dataset 502 is generated. The training dataset 502 may include multiple training image pairs. The fully-convolutional A3C network 500 may extract contextual and color features using the feature network 505. As indicated above, the feature network 505 may be a convolution neural network configured to perform the contextual and color feature extraction.

The policy network 510 may determine one or more actions the agent may apply to the contextual and color features of the training SDR images. This generates an intermediate representation 520 of the HDR image. The value network 515 may measure how close the intermediate representation 520 is to the corresponding training HDR image. Those skilled in the art will understand that this may include the value network 515 rewarding the agent. A reward may serve as positive or negative reinforcement for the one or more actions used to generate the intermediate representation 520. The value network 515 may then forward this information to the policy network 510 to improve the actions taken by the policy network 510. Thus, the feedback from the value network 515 helps the policy network 510 learn which actions to take during SDR to HDR conversion.

The fully-convolution A3C network 500 is trained to maximize a reward defined as a pixel level distance between the training SDR image and the target training HDR image. The reward is defined by an objective function that measures the similarity between the intermediate representation 520 and the corresponding training HDR image.

Figure 6:
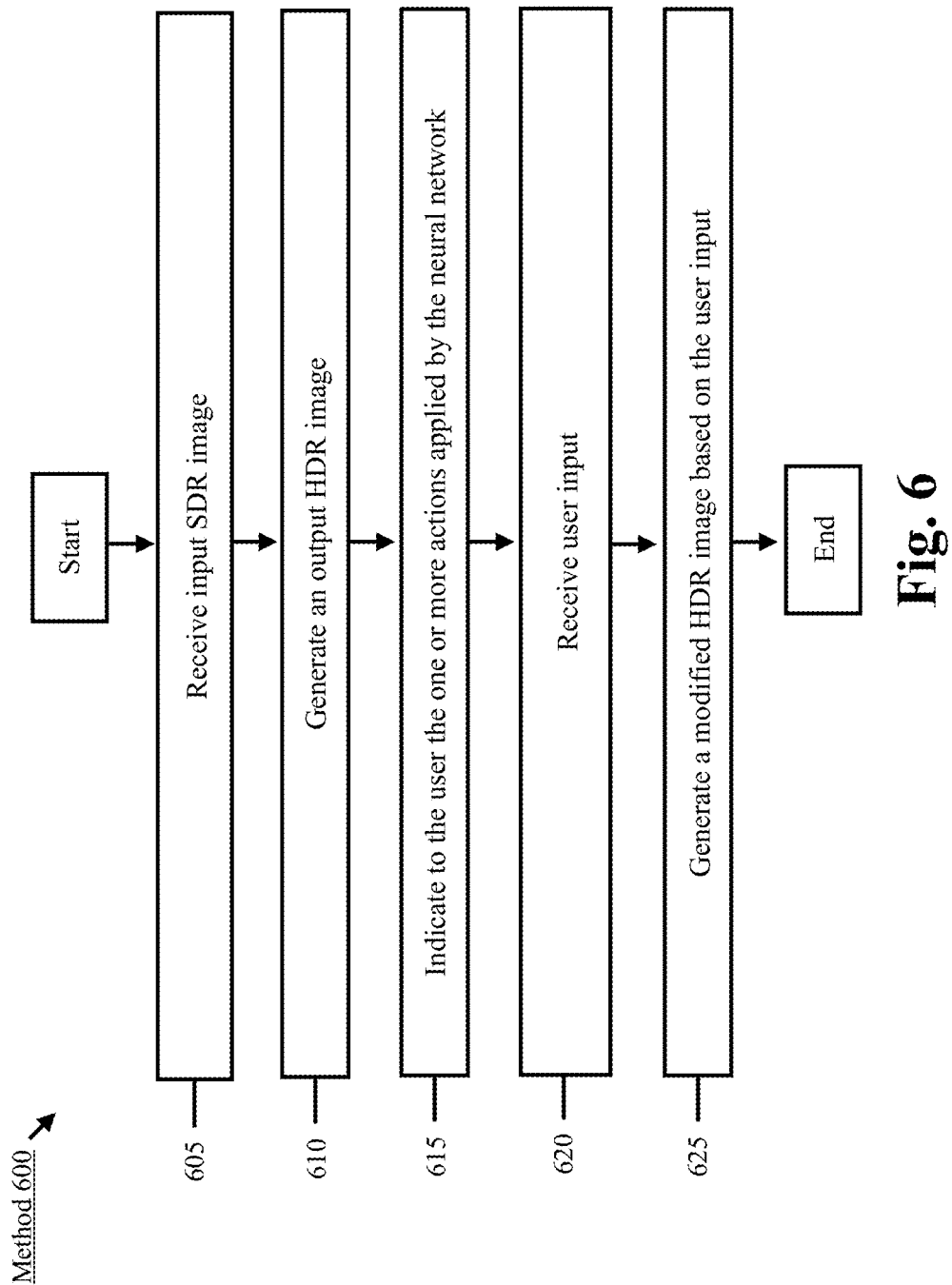
FIG. 6 shows a method for using the neural network to convert SDR content to HDR content according to various exemplary embodiments.

FIG. 6 shows a method 600 for using the neural network to convert SDR content to HDR content according to various exemplary embodiments. The method 600 provides an example of how a user may perform SDR to HDR conversion using the model learned by the neural network in accordance with the method 400. Those skilled in the art will understand that the operations described below may be performed by any appropriate combination of hardware, software or firmware configured to implement the exemplary concepts described herein. Specific examples of the type of hardware, software or firmware that may be utilized will be described below with regard to FIG. 7.

In 605, an input SDR image is received. As mentioned above, reference to an image is merely provided for illustrative purposes. Those skilled in the art will understand that the exemplary concepts described herein may be applicable to any appropriate type of image or video data.

In 610, an output HDR image is generated. As indicated above, this may include applying one or more predefined actions to the input SDR image. The actions applied by the neural network are based on the training performed using the training dataset.

In 615, the one or more actions applied by the neural network are indicated to the user. For example, a GUI may display which user defined actions were applied to the input SDR image.

In 620, user input is received. For example, a colorist may edit the actions displayed on the GUI to tune the HDR image in accordance with their artistic vision. Like the method 300, in some embodiments, this may include editing a set of tonal curves displayed on the GUI. In 625, a modified HDR image is generated based on the user input. Thus, the user may retain artistic control over the conversion process by manually editing the tonal curves.

Figure 7:
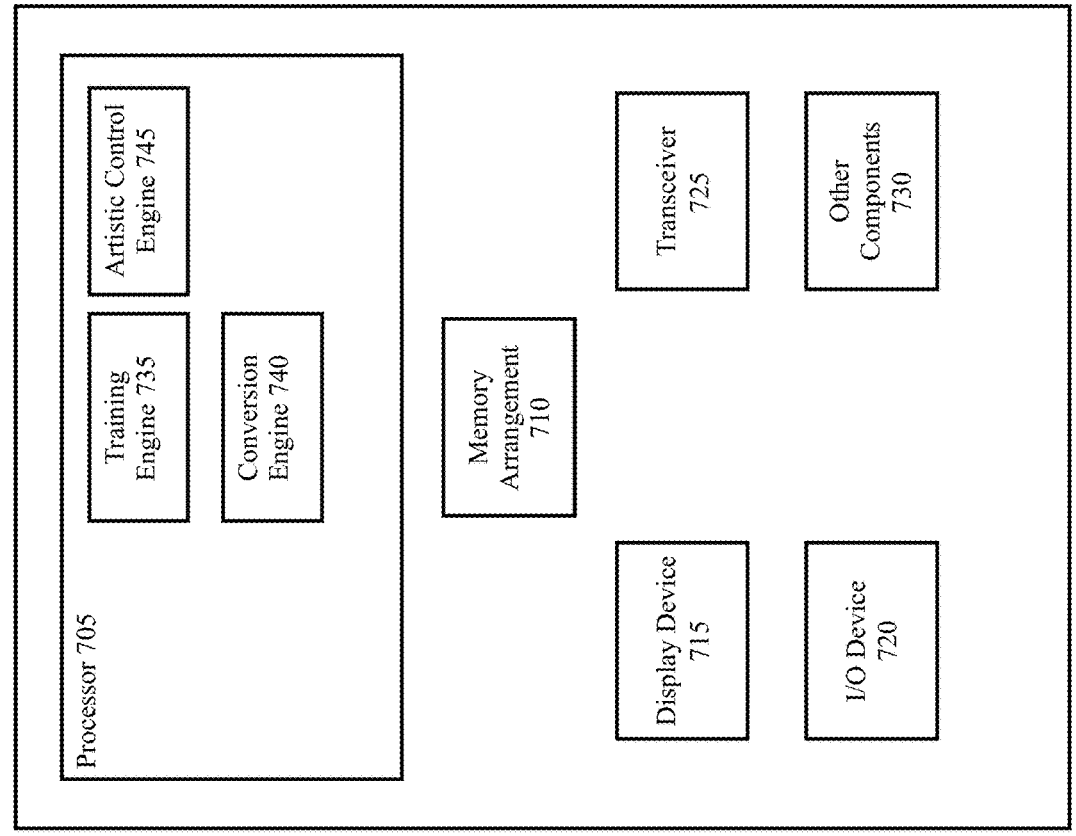
FIG. 7 shows an HDR remastering device according to various exemplary embodiments.

FIG. 7 shows an HDR remastering device 700 according to various exemplary embodiments. The HDR remastering device 700 may represent any electronic device that is configured with the hardware, software or firmware to generate HDR content from SDR content. For example, the HDR remastering device 700 may be a server, a desktop computer, a mobile phone, a tablet computer, a smartphone, an of Internet of Things (IoT) devices, etc.

The HDR remastering device 700 may include a processor 705, a display device 710, an input/output (I/O) device 715, a memory arrangement 720, a communication interface 725, and other components 730.

The display device 710 may be a hardware component configured to present a graphical display. The I/O device 715 may be a hardware component that enables the user to enter inputs. In one example, the display device 710 and the I/O device 715 may be integrated together such as a touchscreen. In another example, the I/O device 715 may be represented as one or more buttons. The communication interface 725 may be a hardware component configured to communicate with a network over a wireless or wired connection. The communication interface 725 may also be configured to communicate with other devices using a wired or wireless connection.

The processor 705 may be configured to execute a plurality of engines for the HDR remastering device 700. For example, the engines may include a training engine 735, a conversion engine 740 and an artistic control engine 745. The training engine 735 may perform a variety of different operations related to training a neural network. As indicated above, this may include training a neural network configured to automatically infer HDR content from input SDR content and training a neural network configured to generate an HDR image by applying one or more user defined actions to an input SDR image. The conversion engine 740 may perform SDR to HDR conversions using the exemplary technique describe herein. The artistic control engine 740 may generate for display a GUI that the user may interact with to modify an HDR image. For example, the GUI may display a tonal curve configured with multiple control points. The user input may manipulate the control points to alter the HDR image. There may be multiple tone curves for different color channels.

The above referenced engines each being an application (e.g., a program) executed by the processor 705 is only exemplary. The functionality associated with the engines may also be represented as a separate incorporated component of the HDR remastering device 700 or may be a modular component coupled to the HDR remastering device 700, e.g., an integrated circuit with or without firmware. For example, the integrated circuit may include input circuitry to receive signals and processing circuitry to process the signals and other information. The engines may also be embodied as one application or separate applications. In addition, the functionality described for the processor 705 may be split among two or more processors. The exemplary embodiments may be implemented in any of these or other configurations of a monitoring device.

The memory arrangement 730 may be a hardware component configured to store data related to operations performed by the HDR remastering device 700. The other components 730 may include, for example, ports to electronically connect to other devices.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a Linux based OS, a mobile device having an operating system such as iOS, Android, etc. In a further example, the exemplary embodiments of the above described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
    collecting multiple training images, wherein the training images include a training standard dynamic range (SDR) image and a training high dynamic range (HDR) image;
    defining a set of color grading actions for use by a neural network; and
    training the neural network to convert an input SDR image into an HDR image using the defined set of color grading actions and the training images, wherein the trained neural network is configured to convert the SDR image into the HDR image by applying one or more color grading actions from the set of color grading actions and generating an output that includes an indication of the one or more color grading actions;
    wherein training the neural network includes generating an intermediate HDR image using the input SDR image, and measuring how close the intermediate HDR image is to the training HDR image.

2. The method of claim 1, further comprising:
    receiving a user input to modify the one or more color grading actions; and
    generating a modified HDR image based on the user input.

3. The method of claim 1, wherein training the neural network includes applying a first color grading action from the set of color grading actions to the training SDR image and wherein the first color grading action is selected based on the training HDR image.

4. The method of claim 1, wherein the neural network is configured to extract contextual features or color features from the training SDR image.

5. The method of claim 1, wherein the set of color grading actions includes at least one of adjusting brightness, adjusting contrast, adjusting color saturation or adjusting exposure.

6. The method of claim 1, further comprising:
    converting the SDR image into the HDR image, wherein converting includes applying the one or more color grading actions from the set of color grading actions.

7. The method of claim 6, wherein converting further includes generating the output that includes the indication of the one or more color grading actions.

8. The method of claim 1, wherein the training images further include a first training SDR image and a first training HDR image, the method further comprising:
    generating a low dimensional latent representation of the first training SDR image;
    generating a first HDR image by decoding the low dimensional latent representation of the first training SDR image; and
    generating an SDR to HDR conversion model using the first HDR image, the first training SDR image and the first training HDR image, wherein the SDR to HDR conversion model is configured to convert a first input SDR image into a first output HDR image and trained to reconstruct a rolled off highlight in the first output HDR image that was not visible in the first input SDR image.

9. The method of claim 8, wherein the rolled off highlight is reconstructed in a region of the first output HDR image that corresponds to a region of the first input SDR image that includes a clipped light level caused by a dynamic range of luminosity of the first input SDR image.

10. The method of claim 8, wherein the first input SDR image uses a first dynamic range of luminosity and the first output HDR image uses a second dynamic range of luminosity, and
    wherein the SDR to HDR conversion model is configured to convert the first input SDR image into the first output HDR image by mapping a first value defined relative to the first dynamic range of luminosity to a second value defined relative to the second dynamic range of luminosity.

11. The method of claim 8, wherein the first input SDR image uses a first color gamut and the first output HDR image uses a second color gamut, and
    wherein the SDR to HDR conversion model is configured to convert the first input SDR image into the first output HDR image by mapping a first value defined relative to the first color gamut to a second value defined relative to the second color gamut.

12. A method, comprising:
    collecting multiple training images, wherein the training images include a training standard dynamic range (SDR) image and a training high dynamic range (HDR) image;
    defining a set of color grading actions for use by a neural network; and
    training the neural network to convert an input SDR image into an HDR image using the defined set of color grading actions and the training images, wherein the trained neural network is configured to convert the SDR image into the HDR image by applying one or more color grading actions from the set of color grading actions and generating an output that includes an indication of the one or more color grading actions;
    wherein training the neural network to convert the input SDR image into the HDR image includes training the neural network to maximize a pixel level distance between the training SDR image and the training HDR image.

13. The method of claim 12, further comprising:
    generating an intermediate HDR image; and
    measuring a similarity between the intermediate HDR image and the training HDR image.

14. The method of claim 12, wherein training the neural network includes applying a first color grading action from the set of color grading actions to the training SDR image, and wherein the first color grading action is selected based on the training HDR image.

15. The method of claim 12, further comprising:
converting the SDR image into the HDR image, wherein converting includes applying the one or more color grading actions from the set of color grading actions.

16. The method of claim 15, wherein converting further includes generating the output that includes the indication of the one or more color grading actions.

17. The method of claim 12, wherein the training images further include a first training SDR image and a first training HDR image, the method further comprising:
generating a low dimensional latent representation of the first training SDR image;
generating a first HDR image by decoding the low dimensional latent representation of the first training SDR image; and
generating an SDR to HDR conversion model using the first HDR image, the first training SDR image and the first training HDR image, wherein the SDR to HDR conversion model is configured to convert a first input SDR image into a first output HDR image and trained to reconstruct a rolled off highlight in the first output HDR image that was not visible in the first input SDR image.

18. The method of claim 17, wherein the rolled off highlight is reconstructed in a region of the first output HDR image that corresponds to a region of the first input SDR image that includes a clipped light level caused by a dynamic range of luminosity of the first input SDR image.

19. The method of claim 17, wherein the first input SDR image uses a first dynamic range of luminosity and the first output HDR image uses a second dynamic range of luminosity, and wherein the SDR to HDR conversion model is configured to convert the first input SDR image into the first output HDR image by mapping a first value defined relative to the first dynamic range of luminosity to a second value defined relative to the second dynamic range of luminosity.

20. A method, comprising:
collecting multiple training images, wherein the training images include a training standard dynamic range (SDR) image and a training high dynamic range (HDR) image;
defining a set of color grading actions for use by a neural network; and
training the neural network to convert an input SDR image into an HDR image using the defined set of color grading actions and the training images, wherein the trained neural network is configured to convert the SDR image into the HDR image by applying one or more color grading actions from the set of color grading actions and generating an output that includes an indication of the one or more color grading actions;
wherein the neural network includes a fully-convolutional asynchronous advantage actor-critic (A3C) network architecture.

21. The method of claim 20, wherein training the neural network includes applying a first color grading action from the set of color grading actions to the training SDR image, and wherein the first color grading action is selected based on the training HDR image.

22. The method of claim 20, further comprising:
converting the SDR image into the HDR image, wherein converting includes applying the one or more color grading actions from the set of color grading actions.

23. The method of claim 22, wherein converting further includes generating the output that includes the indication of the one or more color grading actions.

* * * * *